(No Model.)

G. W. STEVENS.
FRUIT CARRIER.

No. 474,105. Patented May 3, 1892.

Witnesses:

Inventor,
George W. Stevens
By Dewey & Co.
Attys

UNITED STATES PATENT OFFICE.

GEORGE W. STEVENS, OF SAN FRANCISCO, CALIFORNIA.

FRUIT-CARRIER.

SPECIFICATION forming part of Letters Patent No. 474,105, dated May 3, 1892.

Application filed July 27, 1891. Serial No. 400,896. (No model.)

*To all whom it may concern:*

Be it known that I, GEORGE W. STEVENS, a citizen of the United States, residing in the city and county of San Francisco, State of California, have invented an Improvement in Fruit-Carriers; and I hereby declare the following to be a full, clear, and exact description of the same.

My invention relates to an improved compartment box or case which is adapted to the transportation of fruits and the protection of each article in a separate cell by itself, with means for ventilation, and reinforcing devices, for the sections of the carrier, all of which will be more fully explained by reference to the accompanying drawings, in which—

Figure 1:
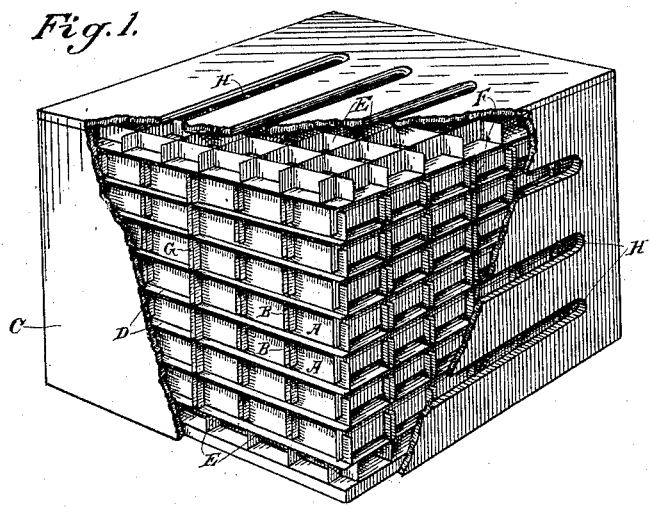
Figure 2:
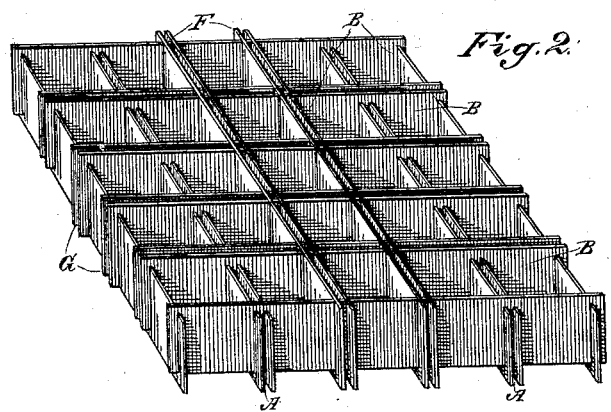
Figure 3:
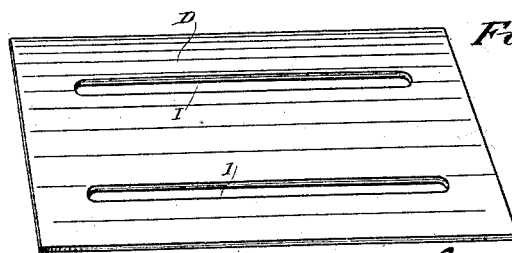

Figure 1 is a view of my box, the broken-away part exposing its interior arrangement. Fig. 2 is a detail of one of the carriers. Fig. 3 is a detail of one of the partitions used between the carriers.

The compartments are made of strips of pasteboard or other suitable material, crossing each other at right angles, as shown at A and B. These transverse strips are fitted to cross each other in pairs, each two parallel strips which form a side of one of the compartments being sufficiently far apart so that they will present elastic surfaces upon all sides against which the fruit rests, and by which the separated articles are prevented from pressing against or bruising each other, and also to admit fruit of different and irregular sizes. These compartments are made of any size suitable for the class of fruit which is to be conveyed. The smallest will be about two inches square and are suitable for apricots. The next sizes may be two and one-fourth, two and one-half, and three inches, and these subdivisions are so arranged that a certain number of them will fit within an exterior box or case, the interior dimensions of which are sufficient to receive these carriers and allow them to be placed one above the other, with suitable horizontal interposing partitions or plates, as shown at D.

In arranging my carrier I first place upon the bottom of the box C a shallow grating E, which may be about one-quarter or one-half an inch in depth, and upon this is laid the first of the horizontal diaphragms D. Upon the top of this diaphragm is placed one of the carrier-sections, formed of the double transverse strips A B, then another of the diaphragms D, and so on until the case is filled, each carrier-section being filled with the fruit before the superposed diaphragm D is placed over it. A grating similar to the one at the bottom completes the filling of the case, which is so proportioned that a certain number of compartments with these top and bottom gratings will just fill it. The gratings and the top and bottom diaphragms may be secured together, if preferred. The sections A A and B B have slits cut in them, so that they fit each other, the series which extend, in one direction reaching from the surface upon which they rest up to a point not quite as high as the upper edges of those which cross them transversely, while these latter in turn do not extend quite to the bottom of the first-named ones. This leaves a considerable air-space extending beneath the series of compartments in one direction and above it in the other direction. In order to render these compartments sufficiently rigid and to further assist in the ventilation, I have shown the reinforcing-strips F F and G G of heavier material, which cross each other at points near the center of each compartment-section. These strips extend the entire distance from the top to the bottom of the carrier, as shown, so that they rest firmly upon the surface below, and in turn present a sufficient bearing for the support of the diaphragm or series which is placed above them. It will be manifest that without these reinforcing-strips, which are preferably made of heavier material than the remainder, the superposed weight upon the lowermost ones would crush them or cause them to be forced together if all were arranged with the air-spaces at top and bottom, as previously described; but by the use of these reinforcing-strips I prevent such an accident. These heavier strips are forced into the narrow slots which are cut for the thinner strips, and thus serve as a lock to bind the whole tray firmly together. The top, bottom, and sides of the exterior box C are either so nailed together as to leave slots or openings H, or these slots may be cut in the material forming the top and bottom, as shown. These slots are made to correspond with the spaces between the reinforcing-strips F F G G, so that when the first tier of carrier-sections is placed within the box the spaces between these strips and the openings in the bottom of the box will stand in line.

The diaphragm or partition D, which is placed upon the top of the first section after it has been filled with fruit, has corresponding slots or openings I made in it, the next carrier-section being placed upon this diaphragm. The next diaphragm D is placed upon it, and it again has slots corresponding, and so on until the top of the case is reached, when a shallow grating, similar to that shown at E, is placed upon the upper diaphragm D and the cover of the box is secured in place over the hole. The cover having similar slots H H, as previously described, it will be manifest that there will be openings entirely through the box and between the layers of fruit, which, together with the peculiar construction of the transverse strips A and B, with the alternate upper and lower transverse air-passages, will provide a very perfect ventilation for the interior of the case and the fruit which is contained therein. In addition to the ventilation thus produced, the protection against damage provided by the double arrangement of these elastic sides of the compartments, and the strengthening or reinforcing to prevent crushing the carriers, it renders the operation of inspecting and examining the fruit exceedingly easy, as each compartment with the diaphragm beneath it may be lifted off one after the other and they may be turned over or in any way inspected in a short time.

Having thus described my invention, what I claim as new, and desire to secure by Letters Patent, is—

1. A fruit-carrying crate consisting of compartments formed of double parallel strips having slits made in one of the edges, corresponding double parallel strips extending transversely to the first ones, with slits whereby the two series are locked together, one series having a space left below its lower edges and the other series having a space extending in the opposite direction between its upper edges, and a box within which several series of these compartments are contained, with interposing diaphragms, substantially as herein described.

2. A fruit-carrier consisting of compartments formed of double parallel strips of material crossing each other at right angles and notched together, so that each compartment has a double elastic wall around it, in combination with reinforcing-strips of heavier material crossing each other near the center of each compartment series, said reinforcing-strips extending from the extreme upper to the extreme lower edges of the compartments and acting as a support for the superposed series, substantially as herein described.

3. In a fruit-carrier, compartments formed by the double transversely-arranged strips notched together so as to leave air-spaces between the parallel sets of strips on one side and corresponding air-spaces between transverse parallel strips upon the opposite side, double reinforcing-strips forming a part of said compartment and extending entirely from the top to the bottom thereof, with air-spaces between them, diaphragms fitted between the different compartments, having slits or openings made in them corresponding with the spaces between the reinforcing-strips, and an exterior case or box within which these compartments are fitted one above the other, with the interposing diaphragms, the top, bottom, and sides of said boxes being perforated or slotted to correspond with the passages between the strips and through the diaphragms, substantially as herein described.

4. A fruit-carrier consisting of compartments formed of double parallel strips of material crossing each other at right angles and notched together, so that each compartment has a double elastic wall around it, and air-spaces formed above and below each compartment at right angles with each other, reinforcing-strips of heavier material crossing each other near the center of each compartment series and extending from the extreme upper to the extreme lower edges of the compartments, horizontal diaphragms interposed between each compartment series, with openings corresponding with the spaces between the double walls, gratings at the top and bottom, and an inclosing case with ventilating-openings corresponding with those in the diaphragms, substantially as herein described.

In witness whereof I have hereunto set my hand.

GEORGE W. STEVENS.

Witnesses:
S. H. NOURSE,
H. F. ASCHECK.